United States Patent
Linthorst

(10) Patent No.: US 6,655,408 B2
(45) Date of Patent: Dec. 2, 2003

(54) TUNABLE RAMP RATE CIRCUIT FOR A MASS FLOW CONTROLLER

(75) Inventor: Eric J. Linthorst, Los Altos, CA (US)

(73) Assignee: Applied Materials, Inc., Santa Clara, CA (US)

( * ) Notice: Subject to any disclaimer, the term of this patent is extended or adjusted under 35 U.S.C. 154(b) by 25 days.

(21) Appl. No.: 09/882,122

(22) Filed: Jun. 13, 2001

(65) Prior Publication Data

US 2002/0189682 A1 Dec. 19, 2002

(51) Int. Cl.$^7$ ................................................. G05D 7/06
(52) U.S. Cl. ................. 137/487.5; 137/10; 137/624.12; 700/282
(58) Field of Search .............................. 137/2, 10, 486, 137/487.5, 624.11, 624.12; 700/282, 306

(56) References Cited

U.S. PATENT DOCUMENTS

| | | | | |
|---|---|---|---|---|
| 3,757,808 A | * | 9/1973 | Peterson et al. ................ | 137/2 |
| 4,739,787 A | * | 4/1988 | Stoltenberg ................... | 137/14 |
| 5,082,517 A | | 1/1992 | Moslehi ....................... | 156/345 |
| 5,129,418 A | * | 7/1992 | Shimomura et al. ........ | 137/486 |
| 5,339,673 A | | 8/1994 | Nakagawa et al. ........ | 73/23.36 |
| 5,394,755 A | | 3/1995 | Sudo et al. ................... | 73/861 |
| 5,458,086 A | | 10/1995 | Smith et al. ................ | 117/200 |
| 5,633,212 A | * | 5/1997 | Yuuki .......................... | 438/773 |
| 5,687,098 A | * | 11/1997 | Grumstrup et al. ......... | 700/282 |
| 5,865,205 A | * | 2/1999 | Wilmer ......................... | 137/2 |
| 5,975,126 A | * | 11/1999 | Bump et al. .............. | 137/487.5 |
| 6,022,483 A | | 2/2000 | Aral ............................. | 216/59 |
| 6,026,834 A | | 2/2000 | Azima ........................... | 137/1 |
| 6,044,701 A | * | 4/2000 | Doyle et al. ................ | 73/202.5 |
| 6,062,246 A | | 5/2000 | Tanaka et al. ................. | 137/12 |
| 6,125,869 A | | 10/2000 | Horiuchi ......................... | 137/1 |
| 6,142,163 A | * | 11/2000 | McMillin et al. ............. | 137/14 |
| 6,152,162 A | | 11/2000 | Balazy et al. ............... | 137/110 |
| 6,178,995 B1 | | 1/2001 | Ohmi et al. ................ | 137/486 |
| 6,205,409 B1 | * | 3/2001 | Zvonar ........................ | 702/183 |
| 6,244,293 B1 | * | 6/2001 | Azima ........................ | 137/486 |

* cited by examiner

*Primary Examiner*—Gene Mancene
*Assistant Examiner*—Ramesh Krishnamurthy
(74) *Attorney, Agent, or Firm*—Moser Patterson & Sheridan

(57) ABSTRACT

A method and apparatus for stabilizing startup gas flow through an MFC supplying reactant gases to a semiconductor system, wherein the method includes receiving a gas setpoint in a tunable activation circuit, determining a desired valve control voltage corresponding to the gas setpoint, and bypassing an MFC valve controller signal. The method further includes ramping a valve control voltage for a flow control valve of the MFC to the desired valve control voltage with the tunable activation circuit, and returning control of the MFC to an MFC valve controller circuit.

5 Claims, 10 Drawing Sheets

TUNABLE RAMP RATE CIRCUIT FOR A MASS FLOW CONTROLLER

BACKGROUND OF THE INVENTION

1. Field of the Invention

The present invention generally relates to mass flow controllers used in semiconductor processing systems.

2. Description of the Related Art

Conventional semiconductor manufacturing techniques may include advanced chemical and/or thermal reactions that are extremely sensitive to the processing conditions within the processing chamber. In a dry etching-type process, for example, the flow of etch gases supplied to a dry etch chamber having a semiconductor wafer positioned therein must be carefully controlled if the desired etch characteristics are to be obtained. Further, in nucleation processes that may be implemented prior to depositing tungsten monolayers in a chemical vapor deposition process (CVD), for example, the deposition chemical reaction generally begins immediately upon the reactant gases being supplied to the processing chamber. Therefore, if the flow of the reactant gases into the processing chamber is not initiated at or very near a calculated optimal flow rate for the particular chemical reaction, then the chemical reaction often yields undesirable and/or unpredictable results that may substantially reduce the device yield from the process.

In an attempt to precisely control gas flow into processing chambers and/or processing environments, conventional semiconductor processing systems have generally implemented one or more mass flow controllers (MFCs) to regulate and/or control the flow of reactant gasses into the processing environment. These MFCs generally operate by receiving a gas supply at an MFC input and outputting a regulated gas supply at an MFC output. The MFC output is generally in communication with the processing chamber/environment, and therefore, are generally used to supply a reactant processing gas thereto.

In operation, conventional MFCs generally regulate and/or control the pressure and/or volume of the gas supply at the MFC output in accordance with at least one input received from a user. FIG. 1 illustrates a conventional MFC 10 that may be implemented in a semiconductor processing system in order to control reactant gas flow into the processing system. The conventional MFC 10 may receive a reactant gas, which may be a single gas or a combination of gases, at a primary side input 11 to MFC 10. The reactant gas flowing into the MFC 10 from the primary side is generally divided into two portions, wherein a first portion flows through a restriction device 12 and the second portion flows through a flow sensor bypass tube 13. Within the flow sensor bypass tube 13 the mass flow of the gas passing therethrough is cooperatively determined by temperature sensors 14, heater 23, and a bridge circuit device 15 in communication with the temperature sensors 14. Heater 23, which may be positioned equidistant from each of temperature sensors 14, heats a constant percentage of the MFC gas flow. With no gas flow, the heat reaching each of sensors 14 is equal. With increasing flow, the gas flow stream carries heat away from the upstream temperature sensor 14 and towards the downstream temperature sensor 14. This temperature difference may be measured and is representative of the gas flow in the bypass tube 13. Therefore, since the flow of gas through bypass tube 13 is proportional to the total flow of gas through MFC 10, then the total flow of gas through MFC 10 may be determined from the mas flow of gas traveling through bypass tube 13. The determined temperature change may be converted into representative electrical signals through a bridge circuit device 15, and thereafter, the representative electrical signals communicated to an amplifier circuit 16. Amplifier circuit 16 operates to amplify the electrical signals and then communicates the representative electrical signals to a user display device 17, which may convert the signals into a format that may be viewed and analyzed by the user. Additionally, the amplifier circuit may communicate the amplified electrical signals to a control circuit 19 within MFC 10.

Control circuit 19 generally operates to control the position of the primary MFC valve 21, which essentially operates to allow gas to flow through MFC 10, via a valve driver 20 in communication with the control circuit 19. Control circuit 19 also receives an input from a user input device 18 that may operate to indicate to control circuit 19 the user's desired flow rate. Thus, control circuit 19 may compare a measured flow rate, which is indicated by the representative electrical signals received from amplifier circuit 16, with a desired flow rate received from user input device 18. Thereafter, the control circuit 19 may adjust the position of valve 21 to increase or decrease the gas flow through MFC 10 such that wherein the increase or decrease is calculated to adjust the gas flow through the MFC closer to the desired gas flow. This process is generally termed a ranging in-type process, as the MFC valve position is adjusted towards the desired position in a dampened oscillatory manner so that the oscillation of the valve position is calculated to decrease to the desired position within a predetermined amount of time. Therefore, if the gas flow is to be increased, for example, then the control circuit would communicate to valve driver 20 to actuate valve 21 in the direction shown by arrow "A". This increases the spacing between the terminating end of valve 21 and the wall of MFC 10 so that additional gas may be allowed to flow through MFC 10 in the direction indicated by arrow "B". The gas passing through MFC 10 is outputted through an MFC output 22, which is generally in communication with a processing chamber or processing environment.

Although conventional MFCs are generally effective in maintaining a relatively constant gas flow once the flow is initiated, the implementation of a control circuit receiving an input from an amplifier circuit and adjusting the valve position in order to obtain a desired gas flow is generally ineffective in generating an accurate and/or predictable gas flow at startup conditions. In particular, the combination of a sensing device transmitting a signal to a valve control device results in a "ranging in" type of operation in order to obtain the desired flow rate. Ranging-in operations, as are known in the art, generally include a process of measuring a current flow and adjusting the current flow in the direction of a desired flow. If the difference between the current flow and desired flow is substantial, then the adjustment, which is generally calculated, may also be substantial. Ranging-type operations are effective when the actual gas flow is proximate the desired flow, as the control circuit generally only has to make a minor valve adjustment to obtain the desired flow. However, in situations where the actual gas flow is not proximate the desired gas flow, then the control circuit generally attempts to substantially alter the valve position in order to bring the current flow rate to a level that is proximate the desired level. This substantial alteration in turn causes a return reaction in the control circuit, which initiates a dampened oscillatory condition that eventually results in the MFC ranging the valve position into a position that yields the desired flow rate. This condition is generally caused by a lack of gas pressure on a flow control valve during a flow startup process. The lack of gas pressure at flow startup generally operates to cause the MFC flow controller to open the flow control valve farther in an attempt to initiate gas flow at the desired rate. However, with no gas resident at the flow control valve upon startup of flow, the controller attempts to increase flow by further operating the flow control valve. Therefore, once gas arrives, the valve is too far open and the controller must compensate in the opposite direction. This effect results in the ranging in and/or oscillation conditions.

FIG. 2 illustrates an exemplary graph of the voltage applied to an MFC valve driver upon startup of a gas flow process. At approximately time equals 1 second in FIG. 2, the MFC may receive a signal to initiate gas flow at a predetermined rate of, for example, 20 standard cubic centimeters per minute (sccm). Upon receiving the signal to initiate gas flow, the MFC generally compares the current gas flow rate with the desired gas flow rate indicated by the signal to initiate gas flow. In this situation, the disparity between the current gas flow rate, which is zero as the MFC valve is completely closed, and the desired gas flow rate is at a maximum value. Upon determining this disparity, the MFC control circuit sends a voltage signal to the valve driver calculated to minimize the disparity in a very short period of time, i.e., the controller calculates a valve that will reduce the voltage/flow disparity in a minimal time period. This voltage signal is evidenced by peak 201 in FIG. 2, which is approximately 0.65 volts. This voltage, which is substantial when compared to the end result voltage of 0.3 volts for the desired flow, is calculated to rapidly open the valve so that the disparity between the desired and actual flow rates will be quickly diminished.

At a short period of time after the initial voltage signal is applied to the valve driver, the control circuit again compares the actual flow rate with the desired flow rate and determines that the voltage signal applied to the valve driver is disproportionately higher than that which is required to generate a flow of 20 sccm, as the measured flow is now greater than the desired flow rate. Therefore, the controller again adjusts the voltage signal, this time by applying a negative voltage and/or a positive voltage of a lesser magnitude, in an attempt to range in to the desired flow rate. This process, which continues in a decreasing oscillatory manner, is generally illustrated as 202 in FIG. 2 and continues for approximately 1.5 seconds until the MFC ranges in on approximately a 0.3 volt voltage signal being applied to the valve driver, which may correspond to the desired 20 sccm gas flow, which is shown as 203.

The rate at which MFC's range in on the valve driver voltage that corresponds to the desired gas flow is generally a function of the electrical gain characteristics of the circuitry in the MFC. Therefore, the ranging rate and/or gain characteristics are generally not variables that the user may manipulate in order to achieve a quicker gas flow response time. As such, MFCs generally range in on the desired gas flow rate in a relatively constant time frame incorporated into the respective MFC via the controller circuit gain characteristics. Although the characteristics associated with this predetermined gain parameter may be acceptable for various semiconductor processing techniques, many chemical and thermal based semiconductor processing techniques are extremely sensitive to initial gas flow parameters. As such, an MFC configured with the above noted gain and/or ranging characteristics may generate an inconsistent and/or degraded processing environment upon activation of the initial gas flow through the MFC. These characteristics, even though they may only be present for a few seconds after initial gas flow is initiated, are generally sufficient to destroy device characteristics of devices manufactured by sensitive thermal and/or chemical reactions, as improper proportions of reactant gases may create undesirable chemical reaction. Another related disadvantage of conventional MFCs is that the ramp rate is not generally controllable, i.e., MFCs are generally preprogrammed for a specific ramp rate which eliminates the option of allowing the user to control/tune this parameter in a semiconductor processing system.

Therefore, there is a need for an improved MFC capable of initiating a gas flow for a semiconductor processing chamber. Further, there is a need for an improved MFC, wherein the MFC is capable of initiating gas flow by immediately opening a flow control valve to a predetermined position that is known to correspond to a specific gas flow. Further still, there is a need for an improved MFC, capable of storing information from previous flow control valve positions and flow rates in order to accurately determine an initial starting position of the flow control valve within the MFC in current flow control situations. Further still, there is a need for a tunable ramp rate circuit for a mass flow controller, wherein the tunable circuit allows a user to fine tune the rate at which an MFC ramps up to a predetermined gas set point. Further still, there is a need for a soft start timing circuit that may be implemented in conjunction with a soft start enabled MFC, wherein the timing circuit is configured to delay the opening of the MFC flow control valve after primary valves of a system have been opened and to bias the flow control valve to a hard closed position until the delay period has expired.

SUMMARY OF THE INVENTION

Embodiments of the invention generally provide a method and apparatus for stabilizing startup gas flow through an MFC supplying reactant gases to a semiconductor system, wherein the method includes receiving a gas setpoint in a tunable activation circuit, determining a desired valve control voltage corresponding to the gas setpoint, and bypassing an MFC valve controller signal. The method further includes ramping a valve control voltage for a flow control valve of the MFC to the desired valve control voltage with the tunable activation circuit, and then returning control of the MFC to an MFC valve controller circuit.

Embodiments of the invention further provide an apparatus for stabilizing gas flow into a semiconductor processing system during startup conditions, the apparatus including a mass flow controller having an electronic setpoint output, a gas flow input, a flow control valve, and a regulated gas flow output. The apparatus further includes a tunable activation circuit device in communication with the flow control valve, wherein the tunable activation circuit device is configured to override the mass flow controller set point output during a gas flow startup process and provide a selectively tunable valve ramp voltage thereto during the flow startup process.

Embodiments of the invention further provide a tunable activation circuit device for a mass flow controller including a first input for receiving a signal corresponding to a desired flow rate from a user, a second input for receiving a set point voltage from a mass flow controller control circuit, and a valve control voltage generator in communication with the first input. The tunable activation circuit device further includes a data storage device in communication with the valve control voltage generator, the data storage device having parameters corresponding to previous flow rates stored therein, a switching device in communication with the first and second inputs, the switching device being configured to switch between the second input and an output of the valve control voltage generator, and an output in communication with the switching device.

BRIEF DESCRIPTION OF THE DRAWINGS

So that the manner in which the above recited features, advantages, and objects of the invention are obtained may be understood in detail, a more particular description of the invention briefly summarized above may be had by reference to the embodiments thereof, which are illustrated in the appended drawings.

It is to be noted, however, that the appended drawings illustrate only typical embodiments of this invention, and are therefore, not to be considered limiting of its scope, for the invention may admit to other equally effective embodiments.

DETAILED DESCRIPTION OF THE PREFERRED EMBODIMENT

Figure 3:
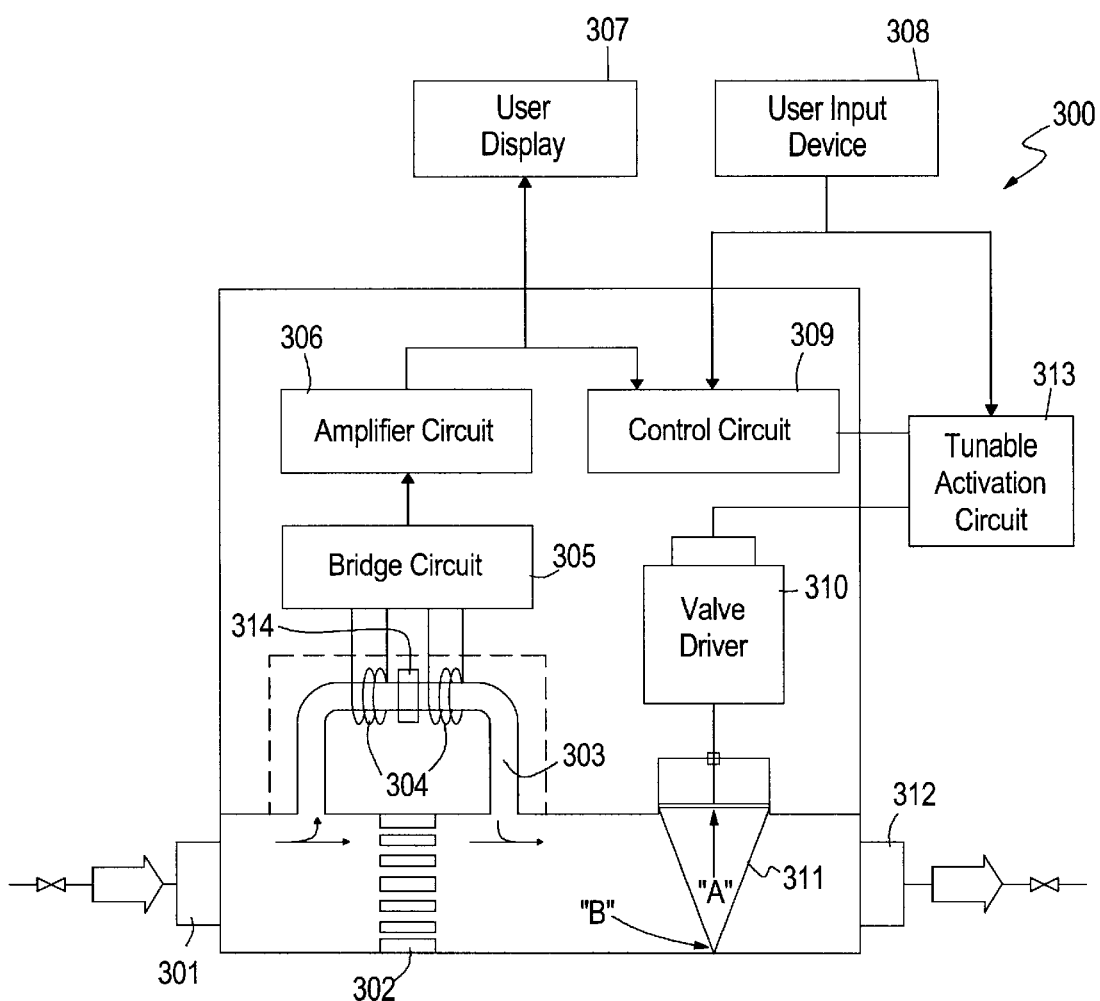
FIG. 3 illustrates an embodiment of an MFC of the invention.

FIG. 3 illustrates a high-level block diagram of an exemplary MFC 300 of the invention. The exemplary MFC 300 may be configured to initiate gas flow without using a ranging process, and therefore, eliminate overshoot characteristics inherent to conventional MFCs. Additionally, MFC 300 not only eliminates overshoot characteristics, but also allows users to tune the ramping characteristics of the MFC to meet specific processing situations. The exemplary MFC 300 may include gas input 301 in communication with a primary gas flow channel 314. The gas flow channel 314 may include a flow restriction device 302, which may be a washer-type setup, a screen, or other device configured to restrict fluid and/or gas flow to a predetermined level within the gas flow channel 314. Flow channel 314 may also include a flow measurement bypass channel 303 configured to divert a portion of the gas flowing through the primary gas flow channel 314 prior to the flow reaching the restriction device 302. The bypass channel may return to communication with gas flow channel 314 at a point beyond the restriction device 302 in the gas flow, thereby forming a U-shaped bypass channel 303 that essentially branches off of flow channel 314.

A pair of gas flow sensing devices 304 may be positioned proximate bypass channel 303 so that the gas flow therein may be detected. The gas flow sensing devices may be in communication with a bridge circuit 305 that receives the measurements of the gas flow sensors 304. Bridge circuit 305 may be configured to output an electrical signal corresponding to the flow measurements taken by flow sensors 304. An amplifier circuit 306 may receive the electrical signal representing the flow measurements, amplify the representative signals, and transmit the amplified signals to other components within or cooperatively operating with MFC 300. For example, the amplified representative signals may be transmitted to a user display device 307, which may display the measured gas flow rate to the user.

Further, the amplified signal representative of the flow within MFC 300 may also be transmitted to a control circuit 309. Control circuit 309 may operate to control the actuation of a primary MFC flow control valve 311, which may be positioned downstream from the return of the bypass channel 303 to the primary flow channel 314. The flow control valve 311 may be configured for movement in the direction indicated by arrow "A" in order to initiate a flow of gas in the primary gas flow channel, and therefore, supply a gas flow to MFC output 312. Flow control valve 311 may be selectively actuated in a direction to increase the flow within primary flow channel 314, i.e., in the direction of arrow "A", or alternatively, in a direction to decrease and/or stop the gas flow within primary flow channel 314, i.e., in a direction opposite that which is indicated by arrow "A".

A valve driver assembly 310, which may be in communication with the control circuit 309 via a tunable activation circuit device 313, may operate to actuate the flow control valve 311 in order to increase or decrease the gas flow within the primary flow channel 314. Alternatively, the control circuit 309 may be in direct communication with the valve driver 310. However, in this configuration the tunable activation circuit 313 would be positioned to selectively override the output signal of control circuit 309. A user-input device 308, which may be in communication with the control circuit 309, may be used select a desired gas flow rate. The user-input device 308 may be a computer, a manual flow selector, and/or other devices known in the art for allowing a user to select a flow rate. The user-input device 308 may also be in communication with the tunable activation circuit device 313 and communicate the user's desired flow rate thereto.

In operation, the exemplary MFC 300 may be used to initiate gas flow to a processing chamber. The gas flow may be initialized in a relatively linear manner ramping up to the desired flow rate. In the initiation of a gas flow using the exemplary MFC 300, a user generally selects a desired flow rate and/or ramping characteristics for MFC 300 and communicates this information to the user-input device 308. This communication may be via manual user input, through a computer-generated signal, and/or other processes known in the art. The tunable activation circuit 313 receives the information representative of the desired starting flow rate and/or ramping characteristics and initiates the gas flow at or very near the desired flow rate, generally in a manner corresponding to the desired ramping characteristics. The process of initiating the gas flow may include determining a valve control voltage that corresponds to the desired flow rate. The determination of this voltage may be accomplished via reference to flow parameters stored from previous flow operations. Once the voltage is determined, then the tunable activation circuit 313 may ramp the valve control voltage up to the determined voltage in a relatively linear manner, or alternatively, in a manner reflective of the users desired ramping characteristics.

Although the control circuit 309 of MFC 300 may also receive the information from the user input device 308 regarding the desired flow rate, the control circuit 309 is generally not involved in the gas flow startup process. Rather, the signal from the control circuit 309, which may be transmitted to the valve driver 310 via the tunable activation circuit 313, may be ignored by the tunable activation circuit 313 during the gas flow startup process. Therefore, the tunable activation circuit 313 may override the ranging process generally used by the control circuit 309 to initiate gas flow with a predetermined signal that may be sent to the valve driver 310. This predetermined signal may be calculated to immediately actuate the main flow valve 311 to a position proximate the desired flow rate. Once the gas flow is initiated at a flow rate that is proximate the desired flow rate by the tunable activation circuit 313, then the tunable activation circuit 313 may enter into a passive mode and allow the control circuit 309 to control the position of main flow valve 311. When the control circuit begins controlling the main flow valve 311, it will generally operate to fine tune the tunable activation circuit's 313 voltage approximately to a voltage that directly corresponds to the desired flow rate.

Therefore, the tunable activation circuit 313 may be generally used to bypass the output of the control circuit 309 during the gas flow initiation process and to selectively tune the gas ramping characteristics according to specific user-defined parameters during a gas flow initiation process. The tunable activation circuit 313 may supply a predetermined voltage to the valve driver 310 in order to actuate main flow valve 311 to a position proximate the flow rate desired by the user. Once the main flow valve 311 is actuated to a position calculated to approximate the desired flow rate, then the control circuit 309 may reacquire full control of main flow valve 311 and fine tune the valve position to yield the exact flow rate desired.

Figure 4:
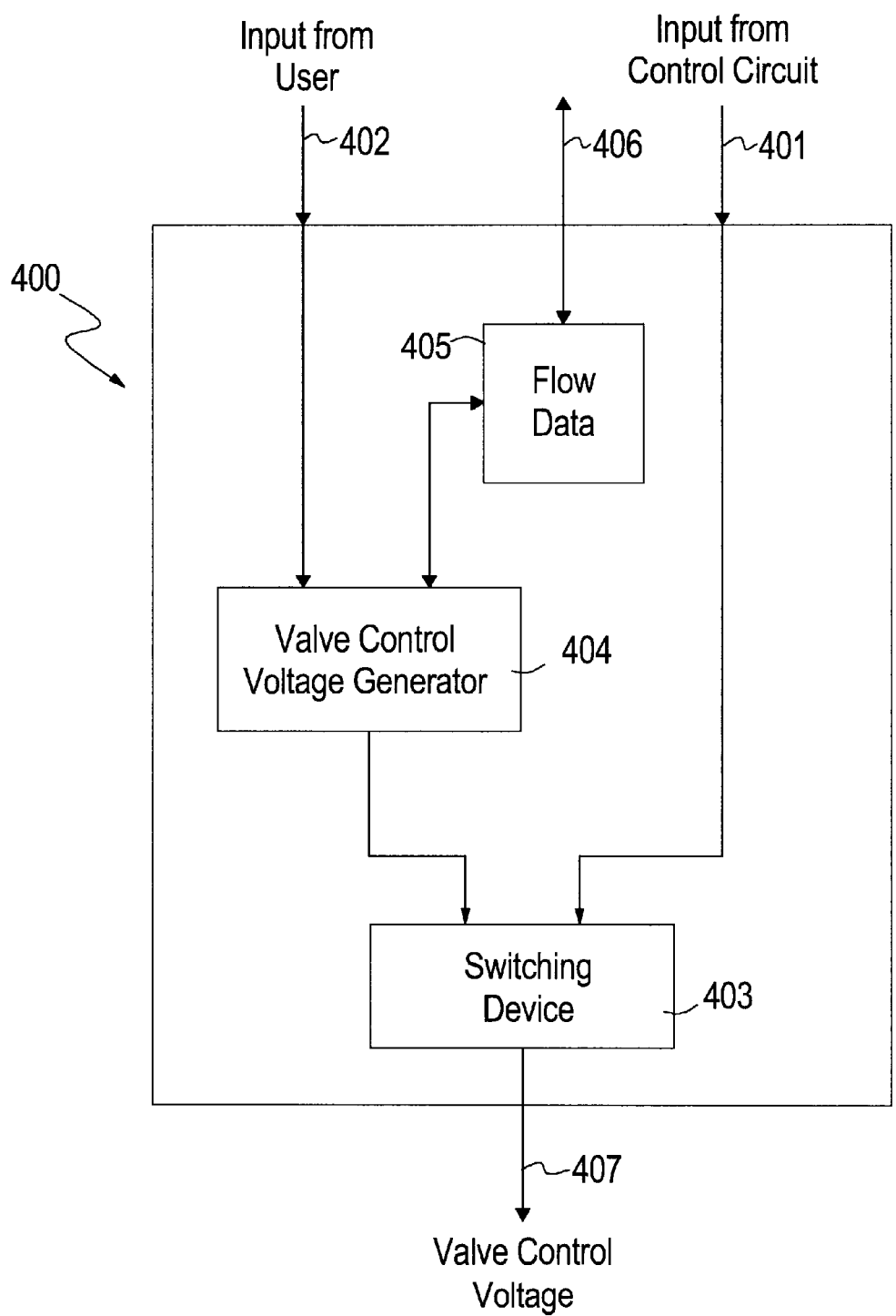
FIG. 4 illustrates an embodiment of an exemplary tunable activation circuit of the invention.

FIG. 4 illustrates an exemplary block diagram of a tunable activation circuit 400. Tunable activation circuit 400 is generally configured to generate a predetermined voltage/waveform that may be used to initialize a mass flow controller valve to a position corresponding to the predetermined voltage in a manner that may be selected/determined by the user. Thus, the voltage generator 404 may be configured to generate a plurality of voltage ramping curves/schemes that may be selected and/or programmed by the user to generate a desired gas flow initiation process. Once the valve is at the position corresponding to the predetermined voltage, then the tunable activation circuit 400 may enter into a passive mode and transmit a valve control signal from an MFC control circuit therethrough.

The exemplary tunable activation circuit 400 may receive an input from a control circuit 401 and an input from a user input device 402. The input from the user input device 402 may be used to determine a flow control valve voltage that is to be applied to an MFC flow control valve in order to initiate gas flow at a desired flow rate. The flow control valve voltage may be determined and/or created by a valve control voltage generator 404 that may receive the input from the user 402. In determining the flow control valve voltage, the valve control voltage generator 404 may interface with a flow data storage device 405. The flow data storage device 405 may store data representative of previous valve control parameters that the valve control voltage generator 404 may use to determine a valve control voltage/waveform corresponding to the user's desired flow rate/waveform. Flow data storage device 405, for example, may contain a table or list of valve control voltages and the corresponding flow rates. Additionally, the flow data storage device 405 may include additional parameters, such as gas supply pressures, flow restriction parameters, chamber pressures, and/or other parameters that may affect the flow rate of an MFC. Additionally, valve control voltage generator 404 may be configured to generate several non-linear gas initiation control voltage waveforms that may be selected by the user to fine tune the initiation of gas flow to correspond to specific desired processing conditions. Thus, valve control voltage generator 404 allows a user to essentially tune the gas initiation process of the exemplary MFC to any one of an infinite number of voltage ramping schemes.

The data stored in flow data storage device 405 may be manually inputted by the user through an interface 406, electronically generated from operational history, either internally or externally supplied, and/or generated through other known means. The flow data storage device 405, for example, may be configured to continually store MFC operational parameters into an organized data structure. Then when the user input 402 indicates a desired flow rate, the flow data storage device 405 may be queried by the valve control voltage generator to determine if the flow data storage device 405 has parameters stored therein representing the desired flow rate. If so, then the valve control voltage generator 404 may read the data corresponding to the desired flow rate from the flow data storage device 405 and generate an appropriate valve control voltage.

The valve control voltage generated by the valve control voltage generator 404 may be transmitted to a switching device 403. Switching device 403 may operate to receive the input from the control circuit 401 and the flow control valve voltage generated by the valve control voltage generator 404. The switching device 403 may operate to receive both inputs and determine an appropriate output. For example, switching device 403 may output the signal received from the voltage control generator 404 during a gas flow startup process, and once the gas flow is initiated, switch to outputting the input from the control circuit 401. Switching device 403 may switch between the valve control voltage generator 404 signal and the user input signal 401 after a predetermined amount of time, after the valve voltage remains constant for a predetermined period of time, immediately upon reaching the desired valve voltage, or at any other time required to optimize the operation of the tunable activation circuit 400.

Figure 5:
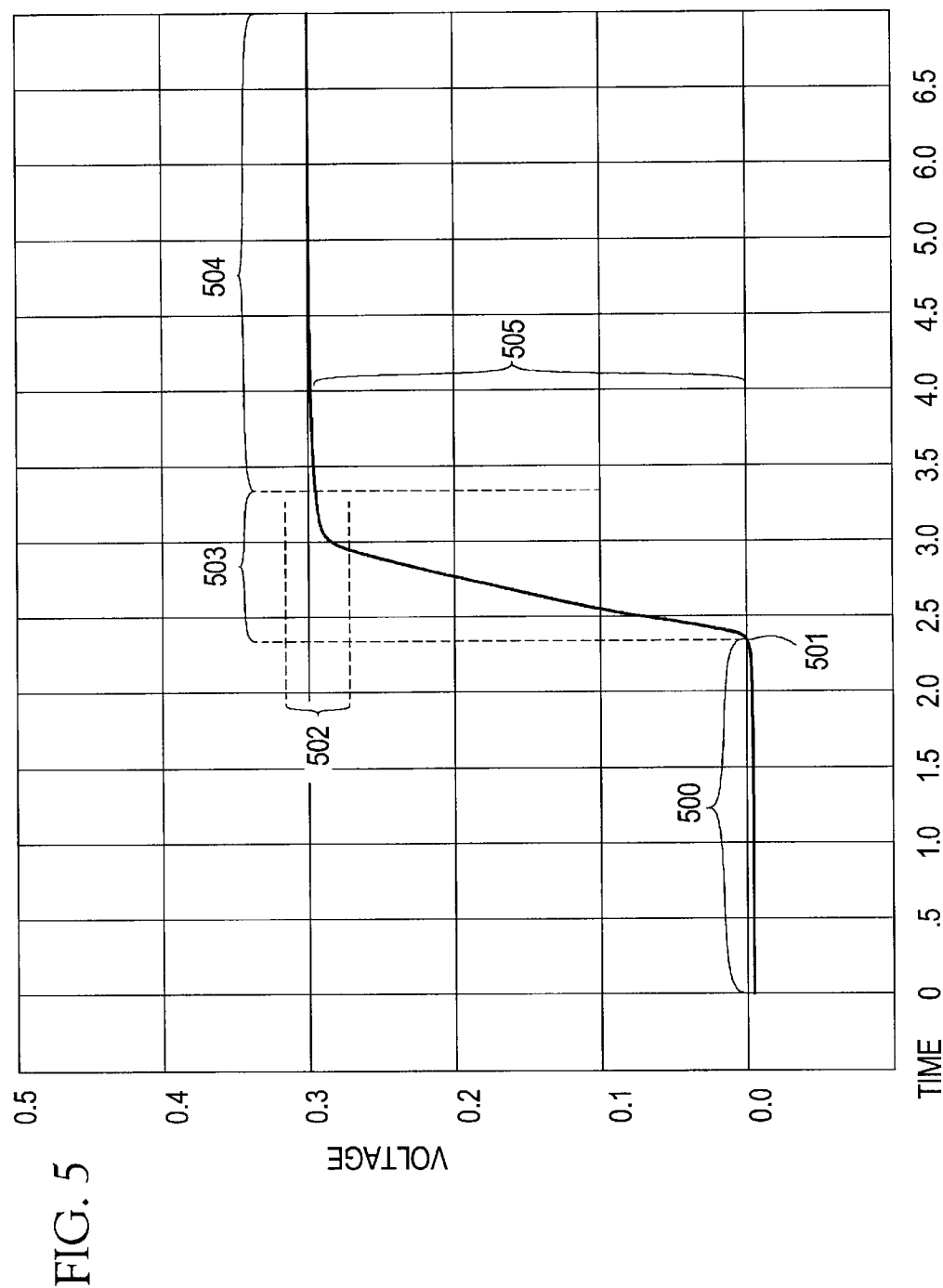
FIG. 5 illustrates a time/voltage graph of an embodiment of the invention.

FIG. 5 illustrates a time verses voltage graph of the output of a tunable activation circuit of the invention. During the time period indicated by 500, the flow control valve of an MFC is generally closed, as the voltage output of the tunable activation circuit is essentially zero. At the point in the graph indicated by 501, the tunable activation circuit begins to initialize gas flow in the MFC. During the time period indicated by 503, the tunable activation circuit ramps the valve control voltage from zero to a value calculated and/or previously determined to closely approximate a desired flow for the MFC. The voltage corresponding to the desired flow, which is indicated by 502, may be determined from previous flow processes, user input, or other known techniques for correlating a valve control voltage with a flow rate. Once the valve control voltage reaches the voltage corresponding to the desired flow 502, then the tunable activation circuit may enter into a passive mode and allow the control circuit of the MFC to control the valve position, which is indicated by 504 in the graph.

FIG. 5 further illustrates that the ranging characteristics of conventional MFCs may be eliminated through the use of the tunable activation circuit of the invention. More particularly, upon initialization of a gas flow in an MFC using an embodiment of a tunable activation circuit of the invention, the MFC valve control voltage smoothly increases to a voltage calculated and/or previously determined to generate the desired gas flow, as shown by 505 in FIG. 5. The slope of the voltage increase, i.e., portion 505, may be increased or decreased by the valve control voltage generator 404, for example, as shown in FIG. 4. Therefore, an embodiment of a tunable activation circuit of the invention allows the MFC to both avoid negative ranging characteristics and to open and/or close the MFC flow control valve at whatever rate is desired, assuming that the physical characteristics of the valve and driver are capable of opening/closing at the determined speed. Additionally, the characteristics of the curve represented by portion 505 of the voltage curve may be modified, and therefore, both linear and non-linear voltage ramp curves may be implemented in order to yield optimal gas flow initiation. Therefore, the tunable activation circuit provides users with the ability to tune the gas flow initiation process characteristics of an MFC.

This flexibility provides an additional advantage over conventional MFCs, as the gain characteristics of conventional MFCs is generally fixed for each device. Therefore, if the user desires to adjust the gain characteristics of a conventional system in order to increase device yield or decrease the device failure rate, for example, then the user must generally exchange the MFC for another unit having the desired gain characteristics. Alternatively, the implementation of the tunable activation circuit allows the user to simply adjust the gain of the valve control voltage generator without incurring the overhead associated with a complete exchange of an MFC.

Figure 1:
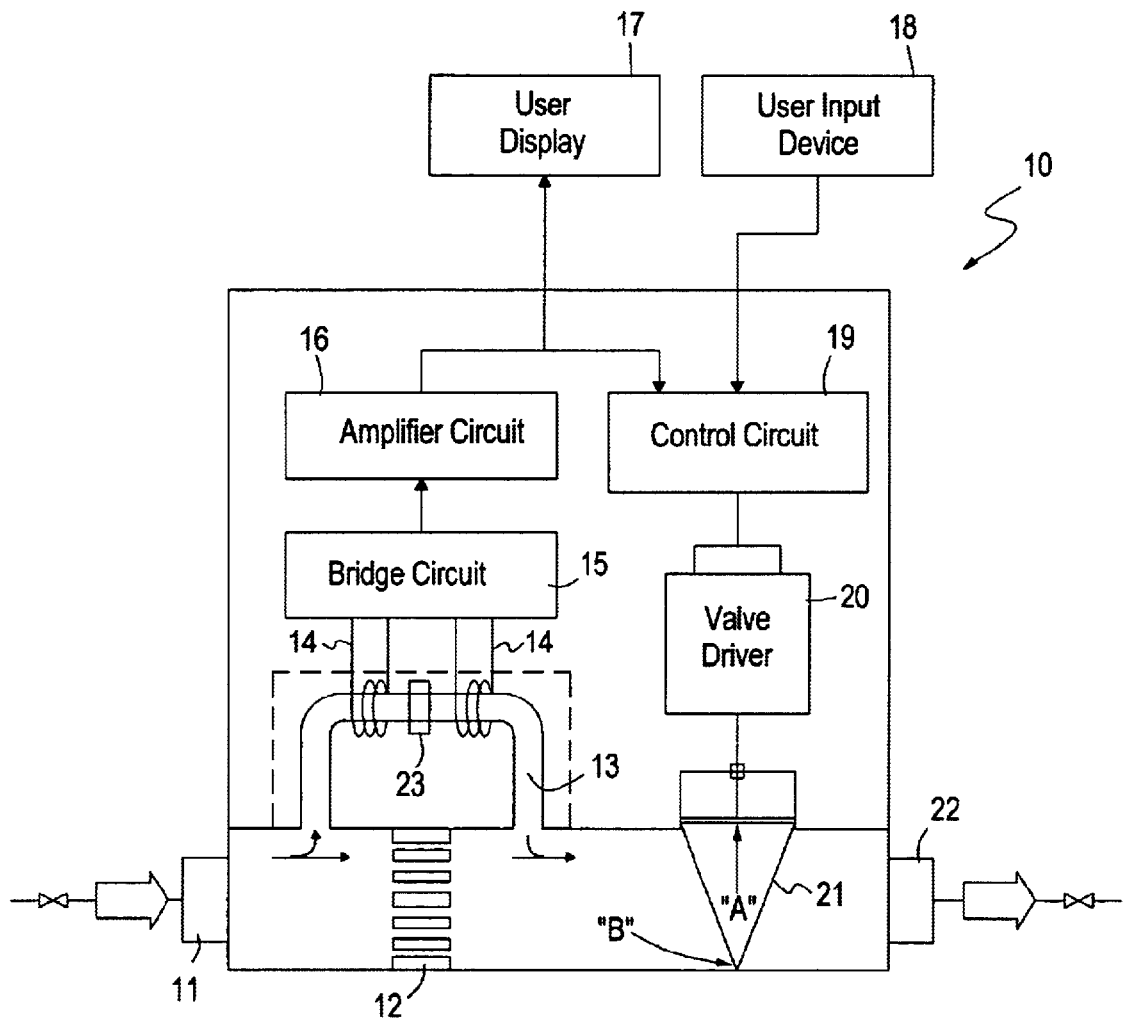
FIG. 1 illustrates a conventional MFC.
Figure 2:
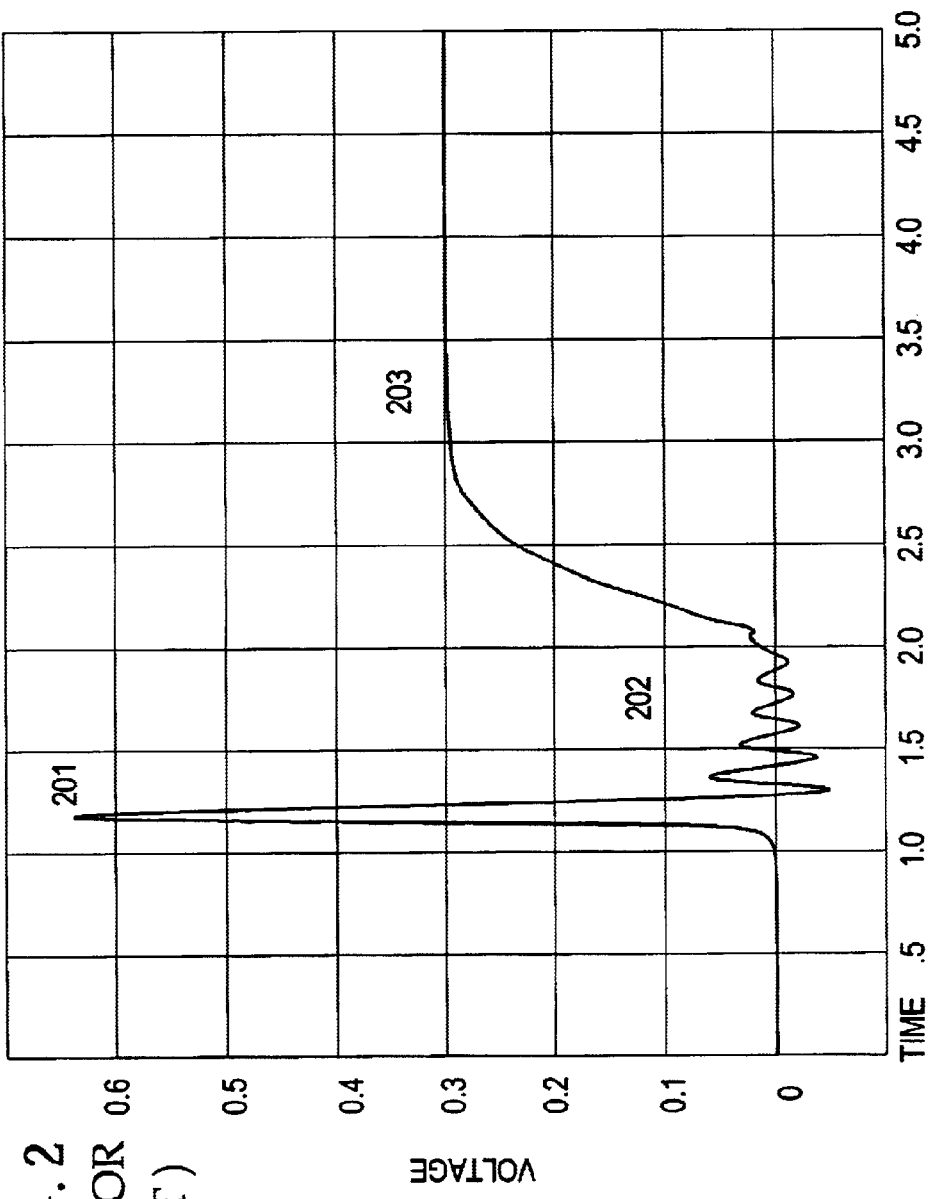
FIG. 2 illustrates a graph of a voltage applied to a valve driver verses time for a conventional MFC.

In another embodiment of the invention, the operational characteristics of a tunable activation circuit may be built into an MFC. For example, a control circuit, such as the control circuit illustrated in the exemplary MFC of FIG. 1 may be modified to include the features of a tunable activation circuit, and therefore, the external presence of the tunable activation circuit discussed above may be eliminated.

The result of the embodiments of the invention yields an MFC capable of being used in sensitive semiconductor manufacturing processes requiring precise gas control in the first few seconds after flow is initiated. For example, in the nucleation process for blanket tungsten film deposition for integrated circuit manufacture, the initial gas flow must be precisely controlled. At the very beginning of the deposition process, the concentration and/or flow rate of the reactants, and in particular, $WF_6$, is critical to the success of the deposition process, as an improper or unstable concentration generally destroys the device yield, as a high contact resistance may be generated. Therefore, conventional MFCs are generally undesirable, as the ranging characteristics destroy device yield. Alternatively, implementation of the tunable activation circuit has shown to adequately regulate the reactant concentration so that the contact resistance of the resulting integrated circuits is effectively minimized. It should be noted, however, that the instant-on feature provided by embodiments of the present invention is not desirable for all semiconductor manufacturing processes, as an instant-on type of gas flow may in fact damage some processes. However, it is to be noted that embodiments of the invention provide a "tunable" circuit that may be used in conjunction with a MFC to provide precise control over the gas flow initialization process of an MFC. The tunable circuit may generally provide users with the ability to initiate gas flow at essentially any desired flow rate and using essentially any desired flow ramp process.

In another embodiment of the invention, an MFC setpoint cable is brought outside the MFC. The setpoint cable may then be monitored by a tunable activation circuit device of the invention in a passive mode. When the MFC initiates gas flow, the tunable activation circuit may activate from a passive mode and temporarily override the signal of the MFC being transmitted to the MFC flow control valve driver. During the override period the tunable activation circuit may operate to initialize MFC gas flow via application of a valve control voltage to the MFC valve control valve driver. Once the valve control valve driver has actuated the MFC flow control valve to the desired position, which is generally proximate the position representing the desired flow rate, then the tunable activation circuit may return to a passive mode and allow the normal MFC control circuitry to actuate the MFC flow control valve via the set point cable.

Figure 8:
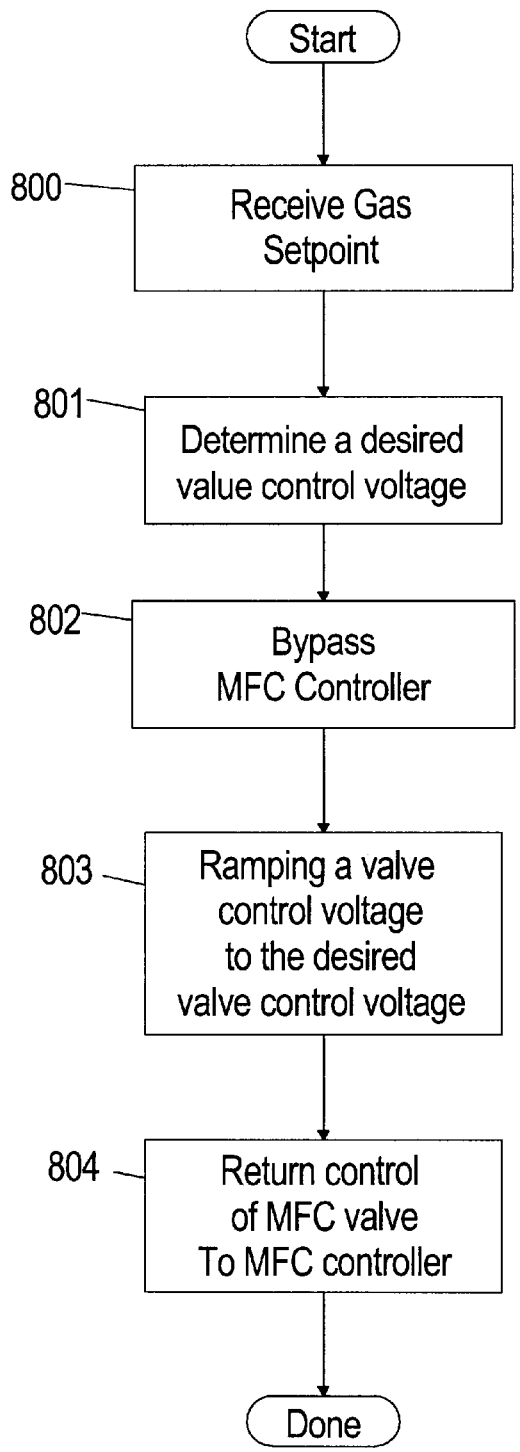
FIG. 8 illustrates an exemplary flowchart of a method of an embodiment of the invention.

FIG. 8 illustrates an exemplary flowchart of a method for eliminating overshoot in a gas flow initialization process using a mass flow controller. The exemplary method begins at step 800, where a tunable activation circuit receives a gas setpoint signal. The gas setpoint signal may be received from an MFC control circuit, from a user input/control device, or another device configured to generate the setpoint signal. Once the setpoint signal is received by the tunable activation circuit, the tunable activation circuit proceeds to determine a desired valve control voltage and/or voltage waveform at step 801. The determination of the desired valve control voltage/waveform may include indexing into a storage medium to retrieve a voltage setting/waveform that corresponds to the users desired flow. As such, the storage medium may be populated with entries corresponding to previous gas flow conditions, which allows the tunable activation circuit to search through previous flow parameters looking for a set of parameters that matches the parameters desired by the current user.

Once the desired voltage is determined at step 801, the tunable activation circuit may bypass the MFC controller. More particularly, the MFC controller generally includes a connection to a valve driver that operates to actuate a flow control valve within the MFC. Therefore, in order for the tunable activation circuit to control the initialization of gas flow within the MFC, the connection between the MFC controller and the valve driver is generally bypassed at step 802. Once the connection is bypassed, the tunable activation circuit may begin applying a valve control voltage to the valve driver at step 803. This process generally includes ramping the valve control voltage from zero to a voltage calculated to generate the desired flow rate, or alternatively, outputting a desired ramp waveform to the valve driver. The ramping process may include a relatively linear voltage increase from zero to the voltage calculated to generate the desired flow rate, or a non-linear waveform. However, the tunable activation circuit generally does not exceed the voltage calculated to generate the desired flow rate. Thus, the tunable activation circuit avoids ranging in to the voltage calculated to generate the desired flow rate. Once the voltage calculated to generate the desired flow rate is generated and transmitted to the valve driver, it is assumed that the valve is actuated to the position corresponding to the voltage calculated to generate the desired flow rate, and therefore, control of the flow control valve may be returned to the MFC controller at step 804.

In another embodiment of the invention, a soft start activator timing circuit may be provided for use in conjunction with an MFC that includes built-in soft start capabilities. In this embodiment, a soft start activator timing circuit may be configured to interface with an MFC having soft start capability in order to open the MFC flow control valve at a time determined to generate a stable gas flow. Various manufacturers, such as Unit Instruments, Tylan, STEC, and Brooks Instruments, produce MFCs with soft start capabilities. Soft start capability in an MFC generally refers to the ability of an MFC to ramp to the desired flow rate at a predetermined percentage of the desired flow rate each second. For example, Unit Instruments Model 8100 MFC has the ability to linearly ramp to the desired flow rate at 20% per second, thus achieving the desired flow rate in approximately 5 seconds. This ramping process, however, is not a ramping of the actual flow itself. Rather, the ramping refers to the voltage generated by the respective flow control mechanisms that operate to actuate the flow control valve via a valve driver device. Soft start capable MFCs generally operate to open the flow control valve at a slower rate in an attempt to more accurately control the initial gas flow into a processing chamber, while also attempting to minimize overshoot characteristics.

Nevertheless, conventional soft start MFC processes are still generally prone to overshoot characteristics as a result of valve timing schemes in conventional MFCs. For example, conventional MFC configurations utilize an inlet valve positioned upstream in the source gas flow from the MFC, a flow control valve positioned within the MFC, and a final valve positioned downstream in the gas flow from the MFC, generally between the MFC and the processing chamber. When the MFC receives a signal to initiate gas flow, a system controller generally opens the inlet valve and the final valve, while also signaling the MFC to simultaneously open the MFC flow control valve. This often results in the flow control valve in the MFC opening too far, i.e., overshooting, as the gas pressure/flow from the gas source upstream from the inlet valve has not yet reached the flow control valve in the MFC. In particular, since the inlet valve was opened at the same time as the flow control valve within the MFC, the gas is required to travel from the inlet valve through the MFC to reach the flow control valve, which takes a noticeable amount of time. During this time period when the gas is traveling from the inlet valve to the flow control valve, the flow control valve is already attempting to establish and regulate a desired flow rate. However, since there is no gas flow at/through the MFC flow control valve for the time period when the source gas is traveling to the valve, the controller of the flow control valve may continue to open the flow control valve in an attempt to increase the flow to the desired flow rate.

As a result of this process, when the source gas finally reaches the flow control valve within the MFC, the flow control valve may be substantially open. Therefore, this allows a large quantity of the source gas to pass therethrough, resulting in a burst of the source gas traveling through the MFC. The MFC flow controller senses this burst of gas, which is generally a much larger flow than the desired flow, and therefore, the flow controller closes the flow control valve substantially in order to decrease the flow toward the desired flow rate. This process continues until the flow control valve narrows the range between the desired flow rate and the actual flow rate to an acceptable range, which is generally termed a ranging process, as discussed above. However, the end result of this process is an initial burst of the source/process gas into the processing chamber, which in sensitive semiconductor processes, may be detrimental to the device yield and reliability.

Returning to the discussion of soft start features, conventional soft start enabled MFCs generally provide the user with the ability to control the flow ramp rate during the gas initialization process. However, this control is limited to the flow ramp rate provided by the soft start enabled MFC. For example, activation of the soft start capability of an MFC may operate, as briefly noted above, to linearly ramp the flow valve control voltage/gas flow up to the desired voltage/flow in 20% increments per second, assuming that the soft start features of the MFC are configured for this particular rate. Therefore, the voltage/flow ramp time may be increased from approximately 2 seconds up to approximately 5 seconds, thus resulting in the flow control valve opening at a slower rate.

However, soft start enabled MFCs nevertheless still generally suffer from gas flow stability and/or overshoot problems during gas flow startup conditions. In particular, conventional configurations generally open the MFC flow control valve, the downstream flow valve positioned between the MFC and the processing chamber, and the upstream flow valve positioned between the MFC and the gas source all at the same time. Therefore, although the MFC flow control valve may be adjusting its position in order to regulate gas flow, it is possible, and in fact likely, that the gas supply has not yet reached the MFC flow control valve, as the gas supply valve/inlet valve was opened at the same time as the flow control valve. As such, the flow control valve generally opens further in order to increase the flow of gas to the rate desired by the soft start process. This again leads to the unwanted overshoot conditions noted with regard to previous devices when the gas flow reaches the MFC flow control valve, as the valve will generally be substantially open, which results in a gas flow spike or overshoot.

Figure 9:
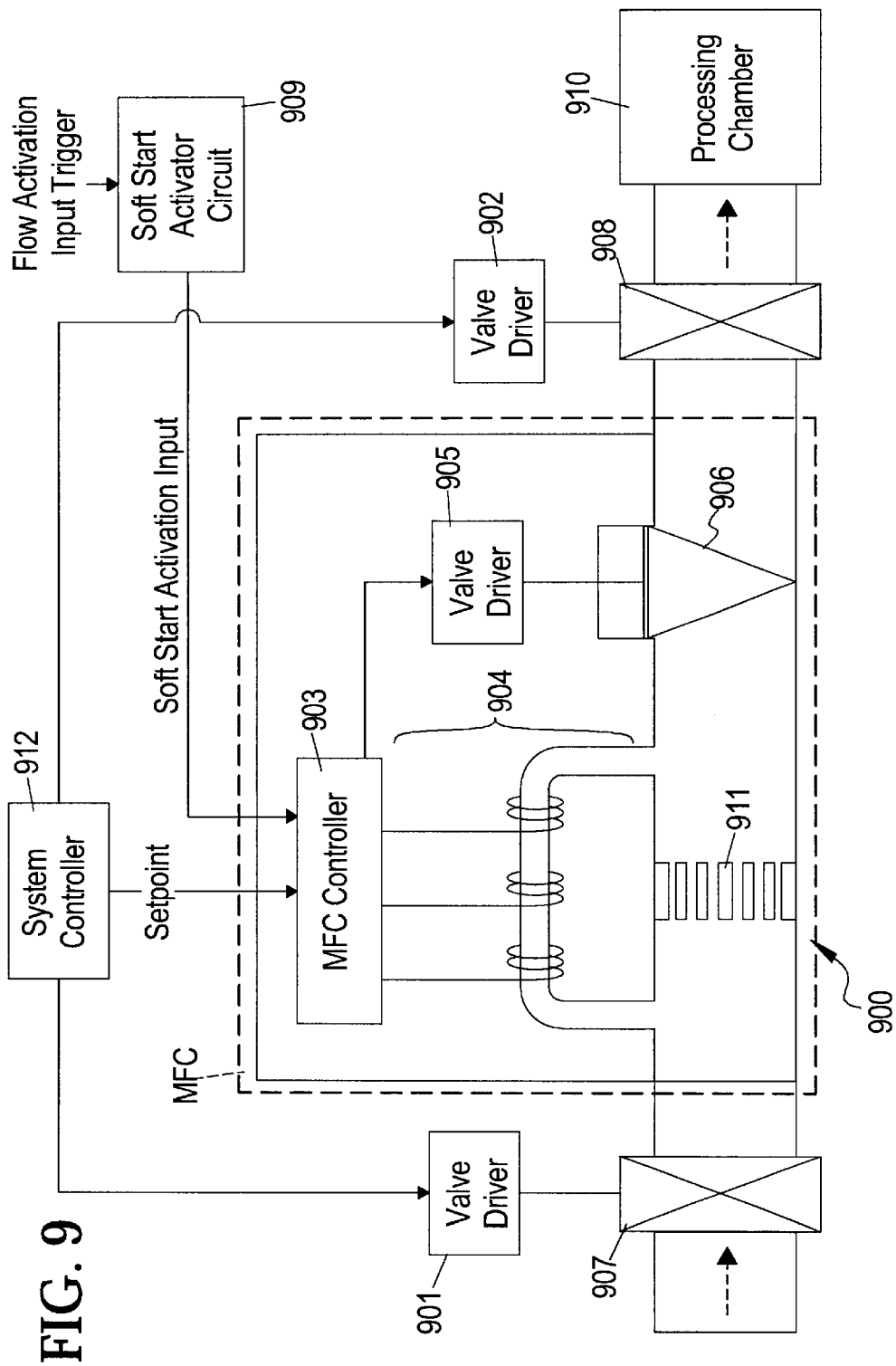
FIG. 9 illustrates an embodiment of the invention utilizing a timing circuit in conjunction with a soft start enabled MFC.

FIG. 9 illustrates an exemplary embodiment of the invention configured to minimize overshoot conditions in MFCs utilizing soft start capabilities. In the exemplary embodiment, MFC 900 may be configured to control/regulate gas flow to a processing chamber 910. The gas to be supplied to the processing chamber 910 may be communicated to MFC 900 through a primary gas inlet valve 907, which is generally positioned upstream in the gas flow between the MFC 900 and a gas supply (not shown). Once the gas is communicated to MFC 900 through primary inlet valve 907, the gas will generally encounter a flow restriction device 911 and/or a sensor device 904 configured to measure the flow of the gas through MFC 900. Once the gas has passed the sensor 904 and/or restriction device 911, then the gas generally encounters a primary flow control valve 906. After passing through the flow control valve 906, the gas generally flows through a final valve 908 before being communicated to the processing chamber 910.

In order to control the operation of each of the respective valves, generally, a system controller 912 is utilized. The system controller 912 may be a computer, for example, that is configured to execute a control program that receives inputs from the semiconductor manufacturing system and manipulates various outputs that may be used to control features of a semiconductor manufacturing process. Therefore, the inlet valve 907 and the final valve 908 are generally in communication with the system controller 912 and receive control signals therefrom to either open and/or close in accordance with the desired semiconductor manufacturing process conditions. Although valves 908 and 907 are typically pneumatic-type valves, these valves may be replaced and/or substituted for other alternative and equally effective valves. Further, although both of valves are shown to be in communication with their respective valve drivers 901 and 902, the present invention is not limited to valves that require valve drivers. Therefore, it is contemplated that each of drivers 901 and/or 902 may in fact be eliminated from various embodiments of the invention. Regardless of the configuration and/or type of valves utilized, system controller 912 operates to both control the opening and closing of these valves, as well as to transmit a setpoint control signal to the MFC 900.

In operation, the soft start enabled MFC 900 of the invention will generally be in communication with a soft start activation circuit 909 via the MFC 900 soft start activation input. The soft start activation circuit 909 generally operates to provide a signal to the MFC 900 indicating that the flow control valve 906 should be opened to allow gas to begin flowing. Activation circuit 909, in particular, may be configured to send the flow control valve 906 activation signal after a predetermined amount of time has passed. This delay for the predetermined amount of time may operate to allow the source gas flow to reach the flow control valve 906 prior to the flow control valve 906 being opened. Therefore, when the flow control valve 906 is opened after the predetermined delay provided by the soft start activator circuit 909 has passed, the gas supply will be present at the flow control valve 906 and immediately flow therethrough. This process operates to minimize the overshoot and/or gas burst characteristics associated with the flow control valve 906 opening in an attempt to increase gas flow, when the source gas has not yet in fact reached the flow control valve 906.

The soft start activation circuit 909 may further operate to bias the flow control valve 906 to a hard closed position at all times when the flow control valve is not expected to be open. This valve closing bias, which may be provided through application of a negative voltage to the valve driver circuit 905, operates to hold the valve in a hard closed position during the delay period so that the gas may flow from the inlet gas valve 907 to the flow control valve 906 prior to the flow control valve 906 being opened.

Figure 6:
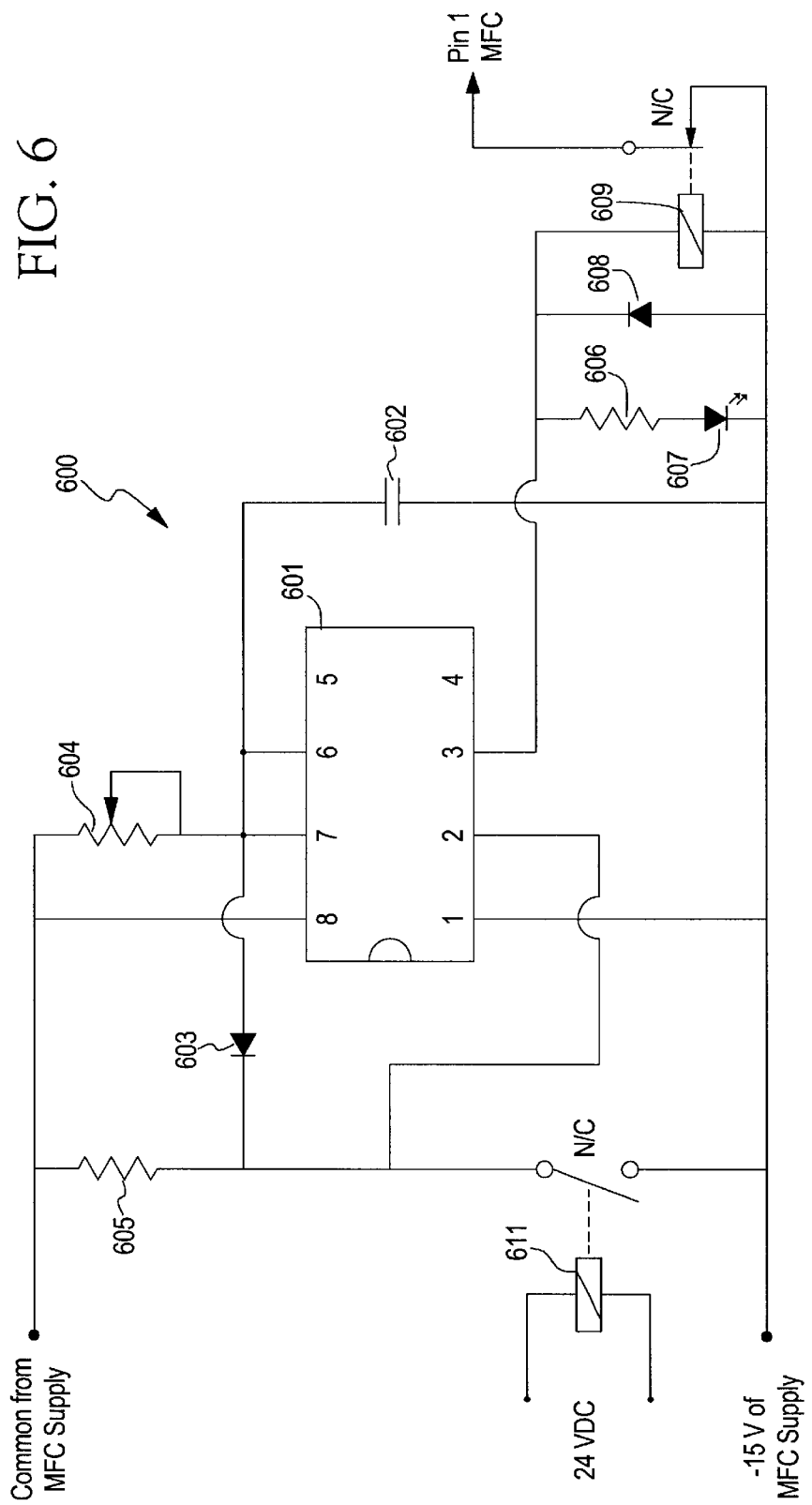
FIG. 6 illustrates an embodiment of a soft start activator circuit that may be used in conjunction with soft start capable MFCs.
Figure 7:
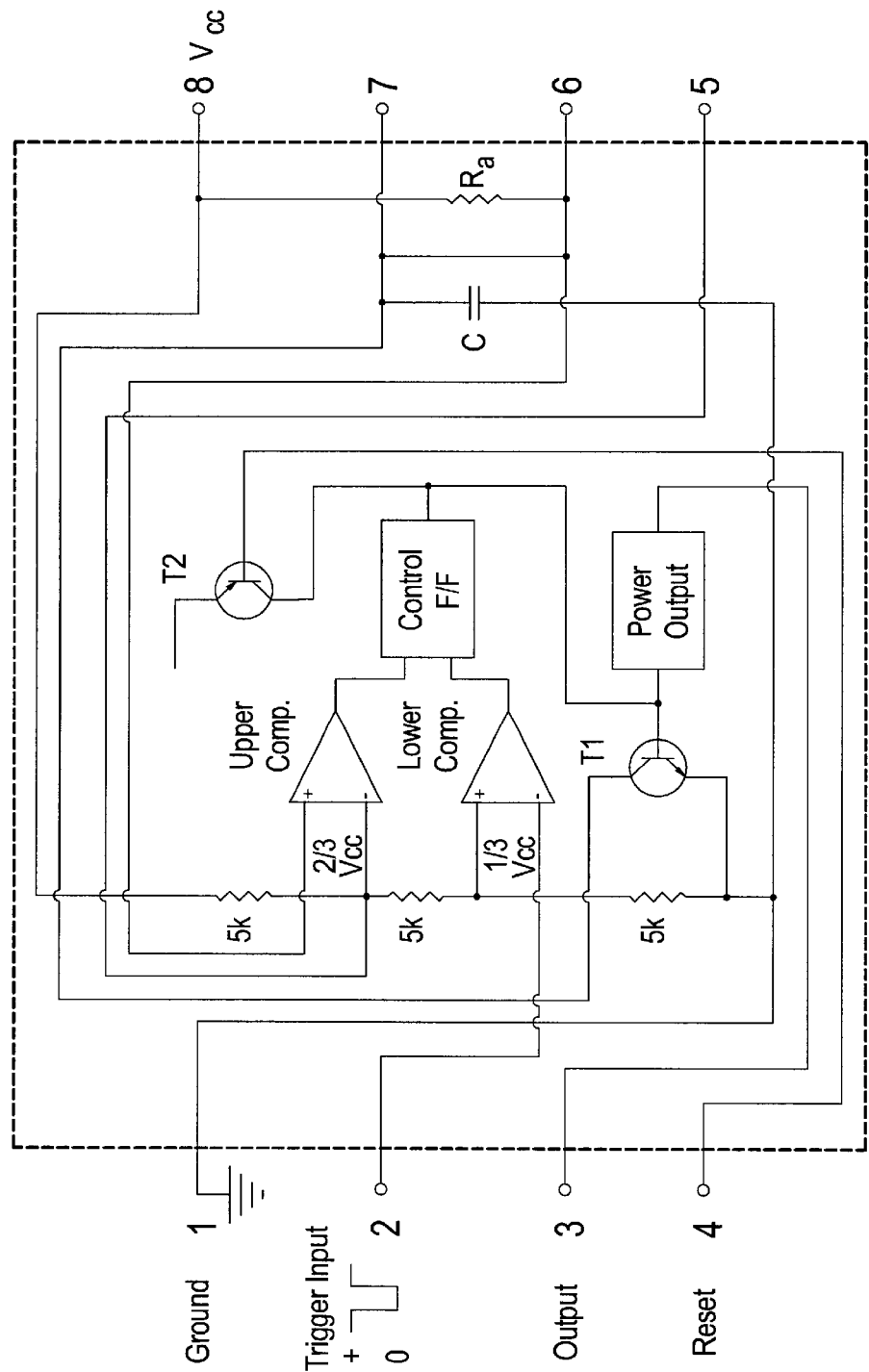
FIG. 7 illustrates an exemplary high level schematic of a timer chip that may be used in an embodiment of the invention

FIG. 6 illustrates an embodiment of a soft start activation circuit 600 of the invention that may be implemented in conjunction with soft start capable MFCs. The central component of activation circuit 600 is a timer chip/circuit 601, which may be, for example, an NE555 timer chip. An NE555 chip is a silicon monolithic timing circuit capable of producing accurate timing delays, wherein the delay may be precisely controlled through an external resistor and capacitor combination in communication with the chip. FIG. 7 illustrates a high-level schematic diagram of an exemplary NE555 timer chip in communication with an external controlling resistor $R_a$ and capacitor C combination. The control of the timing chip may be extended via implementation of a variable controlling resistor/potentiometer in conjunction with the controlling capacitor, such that as the impedance of the resistor/capacitor combination is varied by the potentiometer, the delay of the timing circuit is proportionally changed.

In the current exemplary embodiment illustrated in FIG. 6, the timing chip (NE555) may be combined with two relays 611 and 609 and a controlling capacitor 602 and variable resistor 604 in order to operate in conjunction with the soft start feature of a conventional MFC so that overshoot characteristics may be eliminated and the initial gas flow into a processing chamber stabilized. The controlling capacitor 602 and variable resistor 604 may be tied to pins 6 and 7 of the timer chip, as shown in FIG. 6, where these pins represent the threshold and discharge pins of the chip, respectively. The variable resistor may be in communication with a common lead from the MFC and the controlling capacitor may be in communication with a negative voltage supply of the MFC. The negative voltage from the MFC may also be supplied to the back side of a normally closed relay 609 so that the voltage applied to the soft start pin of the conventional MFC will be a negative voltage. This negative voltage, which is also applied to the flow control valve driver, generally operates to bias the flow control valve of the MFC to a closed position and not allow for gas leakage until the negative voltage is removed. However, once the timing circuit is activated and the delay period expired, relay 609 may activate, and therefore, remove the negative voltage from the soft start pin of the MFC. In this stage, the voltage supplied to the soft start pin is the voltage on the output pin of the timer chip 600, as the output pin of chip 600 is in communication with the front side of relay 609. The chip output voltage may have a path to the negative MFC voltage through a resistor 606 and a diode 607 and a blocked path through diode 608. Additionally, control resistor 604 and capacitor 602 may have a path to the common terminal of the MFC through diode 603 and resistor 605, while also having a path to the negative voltage via a normally closed relay 611.

Figure 10:
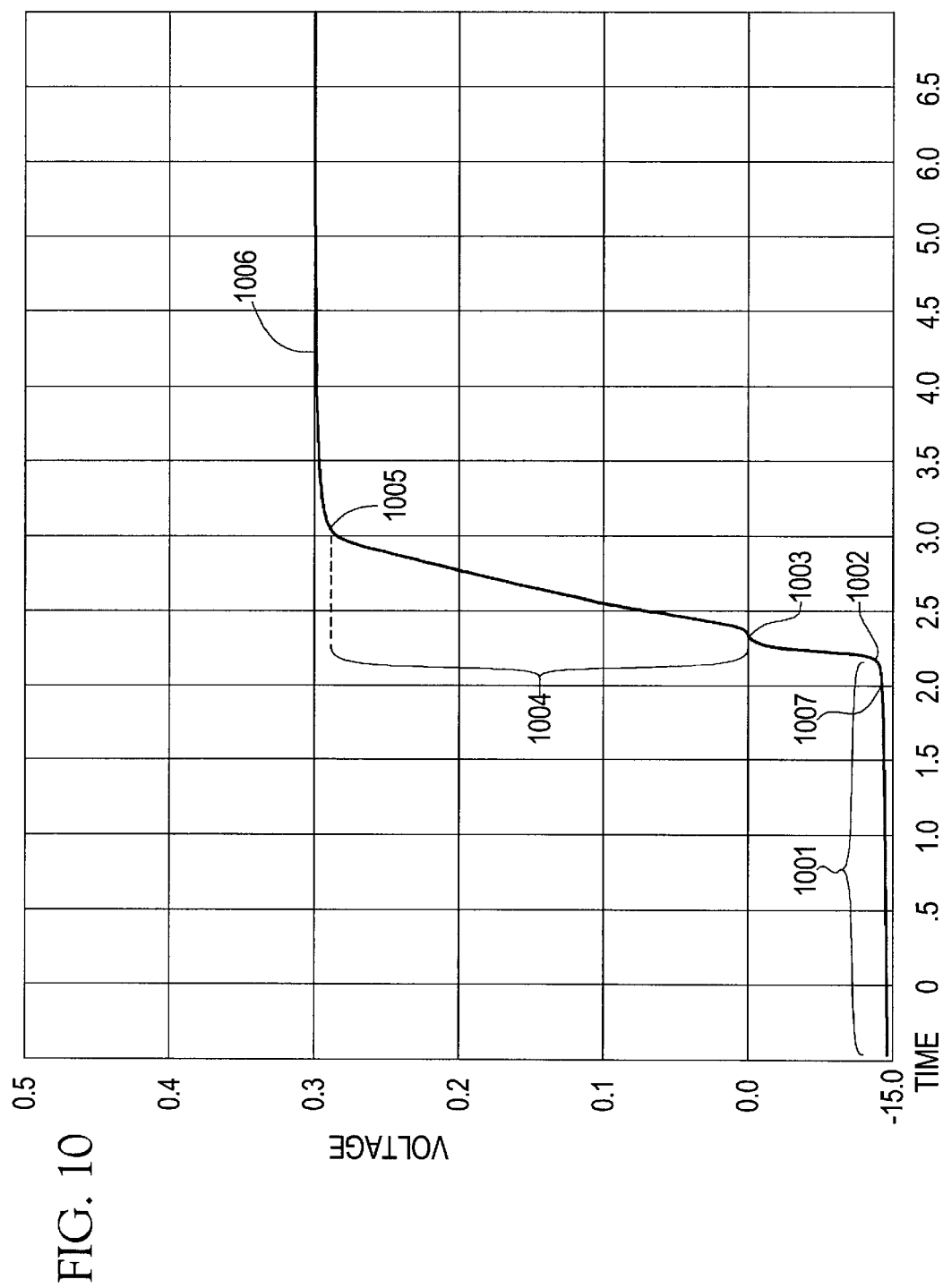
FIG. 10 illustrates a time/voltage graph of an embodiment of the present invention.

Therefore, until the delay period has expired, which is generally determined by the controlling resistor and capacitor combination, a negative voltage is applied to the flow control valve driver, as shown in FIG. 10 at 1001. This negative voltage, which may be −15 volts in the exemplary embodiment, may be communicated to the flow control valve driver from the negative supply voltage of the MFC via a relay, such as relay 609 in FIG. 6. Once the timing circuit delay has expired, which is generally represented by the point 1002 in FIG. 10, then the negative voltage applied to the flow control valve driver may be removed and the flow control valve driver voltage may be allowed to increase/bleed to zero volts, as indicated by 1003 in FIG. 10. Thereafter, a positive valve control voltage may be applied to the flow control valve driver in order to open the flow control valve and allow gas to flow thereby. The delay period may be used to allow a source gas supply to flow to the flow control valve in the MFC, so that when the flow control valve initially opens, i.e., after the delay period and voltage rise from −15 volts indicated by 1003, there will be source gas present on the back side of the valve. Therefore, for example, the inlet and final valves illustrated in FIG. 9 may be opened at the time indicated by 1007 in FIG. 10. Thereafter, a delay occurs between points 1007 and 1002. When the delay expires at the time indicated by 1002, then the negative voltage applied to the valve driver circuit may be removed and the voltage allowed to rise to zero. Then the flow control valve within the MFC may be opened, as the gas will have traveled from the inlet valve to the flow control valve during the delay time represented by the time between points 1007 and 1002, in addition to the time that is required for the valve control voltage to rise from −15 volts to zero volts, as indicated by the difference between 1002 and 1003. The process of applying the positive valve control voltage generally includes ramping the valve control voltage from the zero voltage at 1003 up to the desired voltage 1005 through a ramping process 1004, which is generally specified by the soft start feature of the MFC. Once the valve control voltage is ramped to the desired voltage 1005, then the voltage may level off at the desired voltage and be controlled by the MFC controller.

In another exemplary embodiment, the soft start activator circuit 600 may include an NE555 timer chip 601 in communication with a 10μ Farad control capacitor 602 and a 500 k Ohm variable control resistor 604 on pins 6 and 7 (threshold and discharge pins). The Vcc pin (pin 8) may be in communication with the common terminal of the MFC and a 100 k Ohm resistor 605, which is in communication with the back side of a normally closed relay 611. A negative voltage supply, i.e., −15 volts, may be in communication with the ground pin (pin 1) of chip 600 and the control capacitor 602. Additionally, the negative voltage may be in communication with the diodes 607, 608 and the front side of a normally closed relay 609, as illustrated in FIG. 6. The back side of relay 609 may be in communication with the soft start pin of the conventional MFC when the relay is activated, otherwise, the soft start pin may be in communication with the negative voltage supply until relay 609 is activated. The trigger pin (pin 2) is in communication with the common voltage supply from the MFC via a 100 k Ohm resistor 605 until relay 611 is inactive, and then the trigger pin is in communication with the negative voltage supply of the MFC. Therefore, relay 611 may supply the trigger voltage to the timer circuit 601.

Regardless of the timer configuration utilized, the timer will generally be configured to receive a trigger input, delay for a predetermined period of time, and then output a signal that indicates to the soft start enabled MFC that it is time to open the flow control valve. The trigger input may be received from one of several sources. For example, returning to the exemplary embodiment illustrated in FIG. 6, the flow activation input trigger may be received from the system controller 912. More particularly, the flow activation input trigger may be taken from one of the valve open signals transmitted to valves 907 and/or 908. Alternatively, the flow activation input trigger may be taken from the setpoint input transmitted from the system controller 912 to the MFC controller 903. These trigger inputs, which may replace the relay arrangement designated by 611 in the exemplary circuit of FIG. 6, may generally operate to start the delay timer in the respective timer circuit. During this entire process a negative voltage is generally applied to the MFC valve driver, which operates to bias the MFC flow control valve to a hard shut position. Once the delay period has expired, then the negative voltage may be removed from the MFC valve driver and the voltage allowed to level out at zero volts. At this time the MFC controller may operate to initialize the soft start valve control voltage ramp scheme employed within the soft start features of the MFC in order to open the flow control valve to the desired position.

The end result of the implementation of a timer circuit in conjunction with a soft start enabled MFC is to both eliminate overshoot and to allow the process gases to travel from the upstream inlet valve to the flow control valve within the MFC prior to the MFC initiating gas flow to a processing chamber. The combination of the delay feature and the soft start features of MFCs allows for a predictable initial gas flow that may be valuable in sensitive semiconductor manufacturing processes.

While the foregoing is directed to embodiments of the invention, other and further embodiments of the invention may be devised without departing from the basic scope thereof, and the scope thereof is determined by the claims that follow.

We claim:

1. An apparatus for stabilizing gas flow into a semiconductor processing system during startup conditions, the apparatus comprising:

a mass flow controller having an electronic setpoint output, a gas flow input, a flow control valve, and a regulated gas flow output; and a tunable gas flow activation device in communication with the flow control valve, wherein the tunable gas flow activation device is configured to override the mass flow controller electronic set point output during a gas flow startup process and provide a selectively tunable valve control voltage to the flow control valve during the flow startup process;

wherein the tunable gas flow activation device further comprises:

a flow control valve voltage generating circuit;

a previous flow data storage device in communication with the flow control valve voltage generating circuit, wherein the flow control valve voltage generating circuit is configured to access the previous flow data storage device in order to determine a flow control valve voltage; and a switching device configured to switch between outputting a mass flow controller circuit valve control voltage and a flow control valve generating circuit valve control voltage to an MFC flow control valve driver device.

2. A tunable gas flow control activation circuit for a mass flow controller, comprising:

a first input for receiving a signal corresponding to a desired flow rate from a user;

a second input for receiving a set point voltage from a mass flow controller control circuit;

a valve control voltage generator in communication with the first input;

a data storage device in communication with the valve control voltage generator, the data storage device having parameters corresponding to previous flow rates stored therein:

a switching device in communication with the first and second inputs, the switching device being configured to switch between the second input and an output of the valve control voltage generator; and an output in communication with the switching device, wherein the tunable gas flow control activation circuit is configured to override a mass flow controller set point output during a gas flow startup process and provide a selectively tunable valve control voltage to a flow control valve of the mass flow controller during a gas flow startup process.

3. The tunable gas flow control activation circuit of claim 2, wherein the valve control voltage generator is configured to generate a setpoint voltage corresponding to the desired flow rate from the user.

4. The tunable gas flow control activation circuit of claim 3, wherein the valve control voltage generator is further configured to generate the setpoint voltage corresponding to the desired flow rate in a ramping process.

5. The tunable gas flow control activation circuit of claim 3, wherein the valve control voltage generator is further configured to ramp up to the set point voltage corresponding to the desired flow rate, wherein the ramp up process includes ramping the set point voltage to a voltage that is at least one of less than and equal to the setpoint voltage corresponding to the desired flow rate.

* * * * *